June 3, 1941.  L. E. GOIT ET AL  2,243,845
TAPERED PLUG VALVE INDICATOR
Filed Nov. 22, 1939   6 Sheets-Sheet 1

L. E. GOIT AND
E. C. BRISBANE
INVENTORS

BY Malcolm J. Barnett
ATTORNEY

June 3, 1941.  L. E. GOIT ET AL  2,243,845
TAPERED PLUG VALVE INDICATOR
Filed Nov. 22, 1939   6 Sheets-Sheet 3

L. E. GOIT AND
E. C. BRISBANE
INVENTORS

BY Malcolm F. Fammotto
ATTORNEY

June 3, 1941.  L. E. GOIT ET AL  2,243,845
TAPERED PLUG VALVE INDICATOR
Filed Nov. 22, 1939   6 Sheets-Sheet 5

VALVE CLOSED
PLUG SEATED

VALVE CLOSED
PLUG UNSEATED

L. E. GOIT AND
E. C. BRISBANE
INVENTORS

BY Malcolm F. Bannett
ATTORNEY

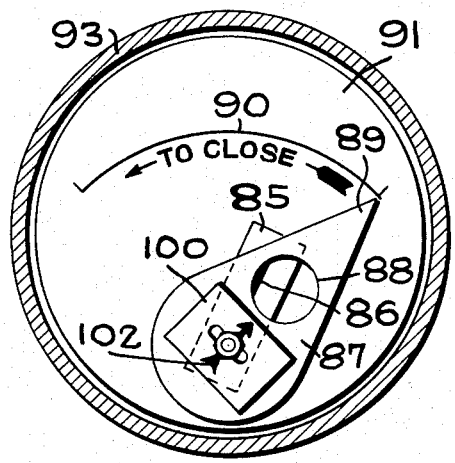
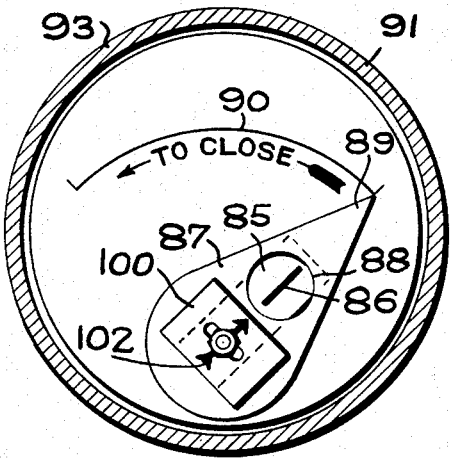
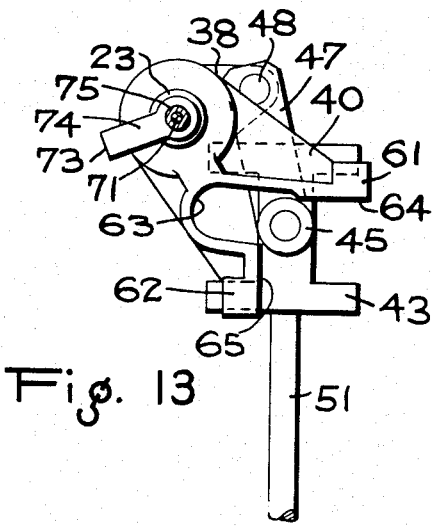
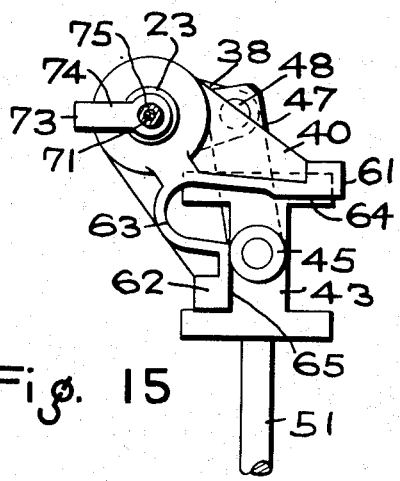

Patented June 3, 1941

2,243,845

UNITED STATES PATENT OFFICE 2,243,845

TAPERED PLUG VALVE INDICATOR

Laurance E. Goit, Los Angeles, Calif., and Eugene C. Brisbane, York, Pa., assignors to S. Morgan Smith Company, York, Pa., a corporation of Pennsylvania Application November 22, 1939, Serial No. 305,598

6 Claims. (Cl. 116—125)

This invention relates to valves and more particularly to means for indicating the position of the valve gates or plugs of tapered plug valves.

In some instances tapered plug valves are installed in inaccessible positions in pipe lines or conduits, and since the valves and their operating mechanisms are usually completely enclosed there has been no way for an operator to observe the position of the valve gates or plugs.

Also, the mechanism usually employed for operating the valve gates or plugs of tapered plug valves includes means for moving the valve plugs in an axial direction in order to unseat and reseat the plugs, and means for rotating the plugs from closed to open position, and vice versa.

In some types of tapered plug valves in which the valve plug or gate is rotated through an angle of 90 degrees from closed to open position and vice versa, the mechanism is operated through an angle considerably in excess of 90 degrees in order to effect the unseating of the valve plug at the initiation of the valve operation and to effect the reseating of the valve plug at the completion of the turning movement imparted to the valve plug.

It is, therefore, an object of the present invention to provide an improved indicating mechanism which is operatively associated with the operating mechanism of a tapered plug valve in such a manner that the position of the valve plug is indicated at all times.

Other objects and advantages of the invention will be more apparent from the following detailed description of an approved form of apparatus constructed and operating according to the principles of the invention.

In the accompanying drawings:

Fig. 12 is a view similar to Figs. 8 and 10 showing the indicating mechanism in valve open, plug unseated position;

Fig. 13 is a view similar to Figs. 9 and 11, showing the operating mechanism in valve open, plug unseated position;

Fig. 14 is a view similar to Figs. 8, 10 and 12, showing the indicating mechanism in valve open, plug seated position; and Fig. 15 is a view similar to Figs. 9, 11 and 13, showing the operating mechanism in valve open, plug seated position.

Figure 1:
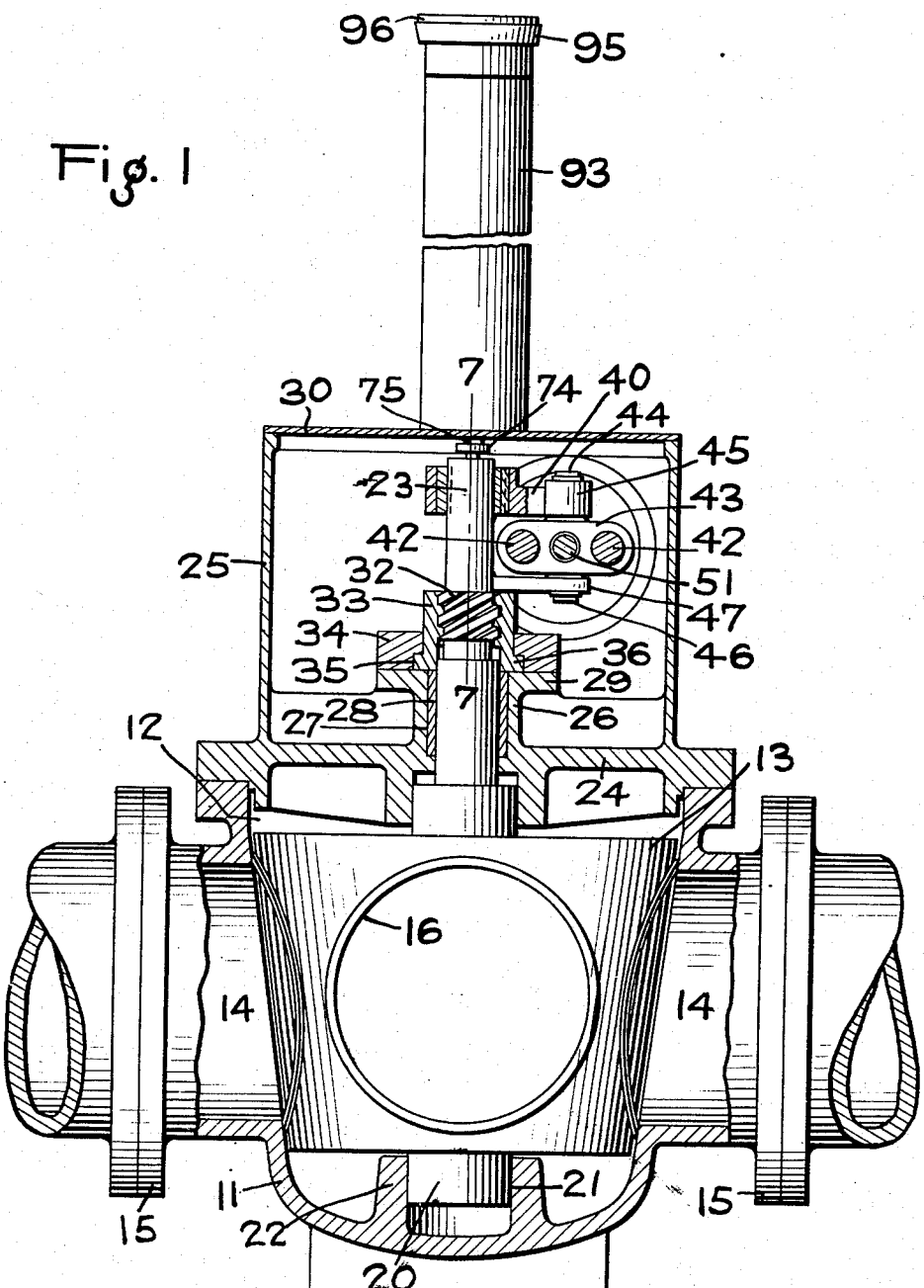
Figure 1 is a side elevation, partly in vertical section, of a tapered plug valve installation having indicating mechanism embodying the present invention.

Referring to the drawings, the valve comprises a main body or casing 11 having a cavity 12 formed therein for a tapered plug 13, the cavity being intersected by a longitudinal waterway or opening 14 which constitutes a passage through the valve. The portion of the casing in which the waterway 14 is formed may terminate in flanges 15, by which the valve can be connected to the ends of pipes or conduits in well known manner.

The plug 13 has a passage 16 formed therein, so that when the plug is in open position, a bore will extend through the valve from end to end.

The plug is supported for both axial and rotary movement in the valve body 11. At its lower or smaller end the plug 13 is formed with an extension in the nature of a trunnion 20 which is disposed in a bore 21 formed in a tubular extension 22 projecting upwardly from the smaller end of the valve body 11.

At its upper or larger end, the plug 13 has fixed thereto a shaft 23 which extends through the web or wall 24 of a housing 25 attached to the valve body 11.

Formed centrally of the wall 24, is a boss 26 having a bore 27 in which is mounted a suitable packing 28 for sealing the joint between the valve shaft 23 and the wall 24.

The upper end of the boss 26 is formed with a flange 29, the purpose of which will be hereinafter described.

Figure 2:
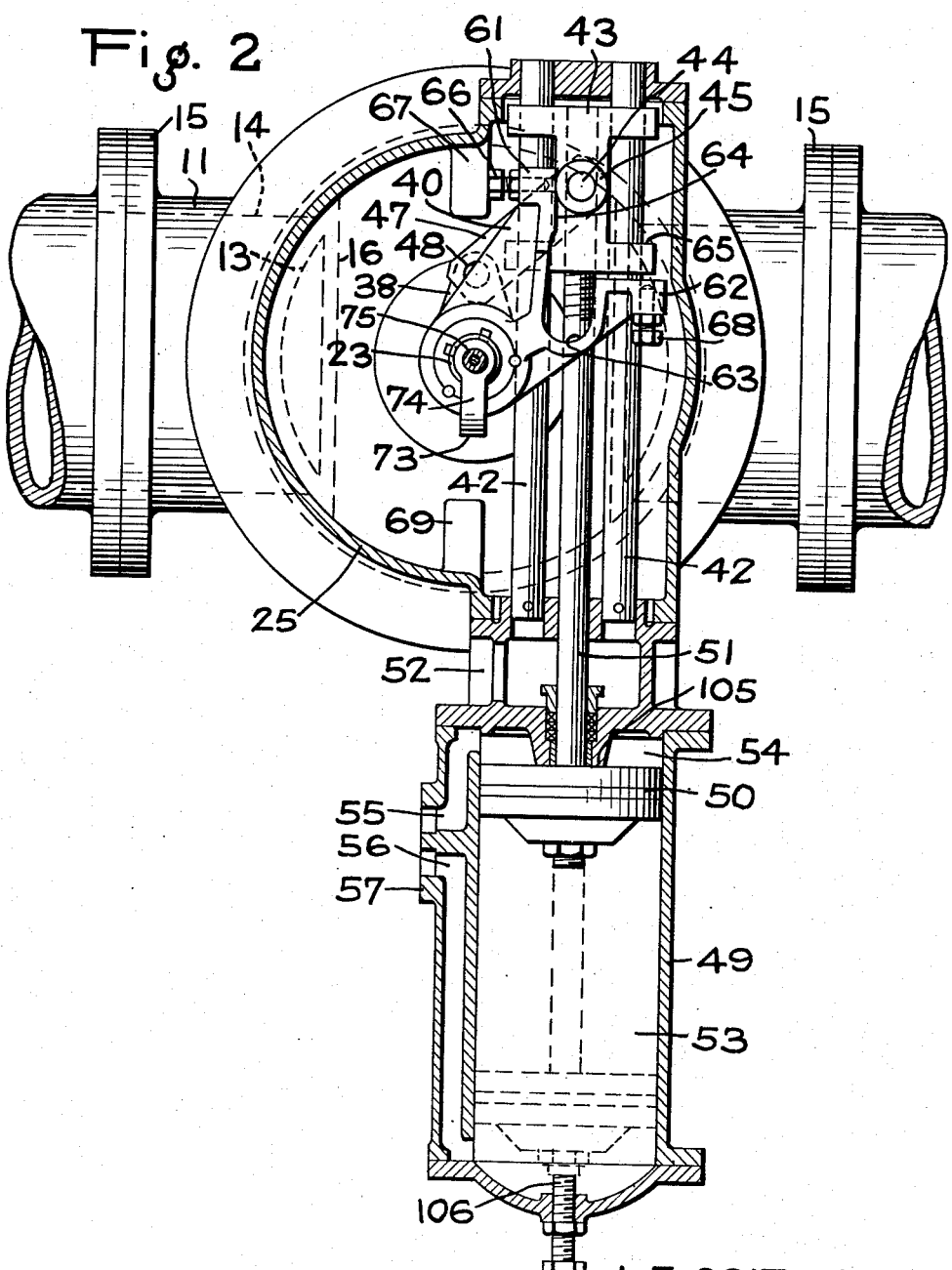
Fig. 2 is a horizontal section of the valve operating mechanism.

As shown in Fig. 2, the housing 25 is generally cylindrical in outline, and the upper portion of said housing is closed by means of a cover 30.

The valve shaft 23 is formed with screw threads 32 of suitable pitch.

Figure 7:
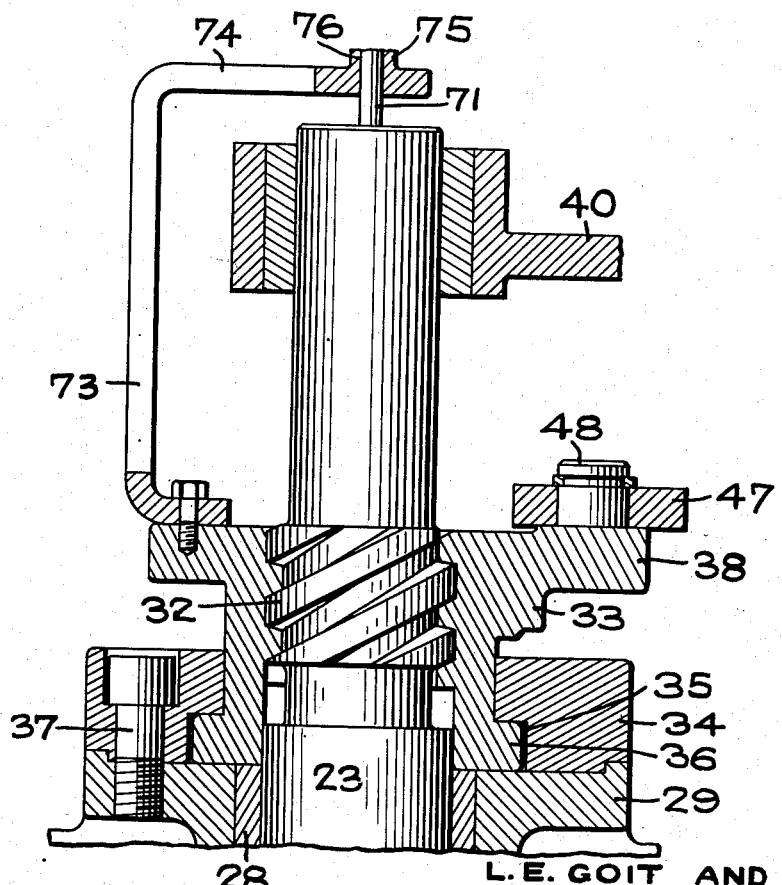
Fig. 7 is a vertical section taken on the line 7—7 of Fig. 1.

Mounted on the threaded portion 32 of the shaft 23 is a lift nut 33 having internal threads engaging the threads 32, as shown best in Figs. 1 and 7.

The lift nut 33 is held in position so that said nut cannot move lengthwise or axially of the shaft 23 but is free to turn with respect to said shaft, by means of a collar 34.

Preferably the collar 34 is made in sections so that said collar can be assembled with the grooved portion 35 thereof around the lower flanged portion 36 of the lift nut 33, said collar being fastened to the flanged portion 29 of the boss 26 by means of screws 37, as shown in Fig. 7.

The lift nut 33 has an extension 38 formed thereon, as shown in Figs. 2 and 7.

Mounted on the plug shaft 23 in spaced relation to the screw threads 32, is a rotator lever 40 which is keyed to said shaft, as shown in Fig. 1. The purpose of the lever 40 is to turn the shaft 23 so that the plug 13 is rotated from closed to open position and vice versa.

In the present embodiment of the invention the plug 13 is adapted to be turned through an angle of approximately 90° from closed to open position and vice versa. The valve operating mechanism is adapted to be actuated in order to unseat the plug, then turn the plug, and finally reseat the plug.

Slidably mounted on a pair of spaced apart horizontally disposed rods 42, is a cross head 43.

Projecting from the upper side of the cross head 43, is a stud 44 on which is mounted a roller 45, and projecting from the lower side of the cross head is a stud 46 on which is mounted one end of a link 47, the other end of said link being pivotally connected, as at 48, to the extension 38 of the lift nut 33 (see Figs. 1, 2 and 7).

Any suitable mechanism may be employed for actuating the cross head 43. In the present instance such mechanism is shown as comprising a power cylinder 49 having a piston 50 with a rod 51 connected to the cross head 43. The cylinder 49 is supported from the housing 25 by means of a bracket 52.

The chambers 53 and 54 on the opposite sides of the piston 50 are connected to ports 55 and 56, respectively, through which fluid under pressure is adapted to be supplied for operating the piston 50.

A control device (not shown) is adapted to be connected to the cylinder 49 at a fitting indicated at 57, Fig. 2, for the purpose of controlling the supply of fluid to the ports 55 and 56 in well known manner.

As shown in Fig. 2, the rotator lever 40 has two arms 61 and 62 between which is a slot 63.

Figure 9:
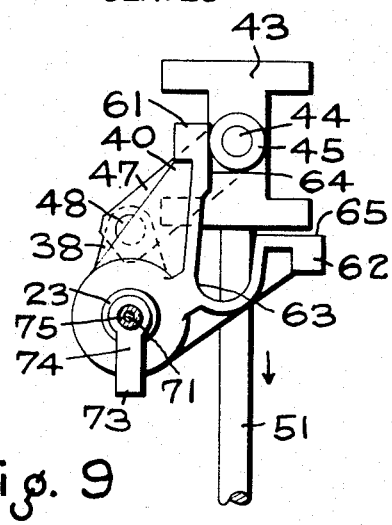
Fig. 9 is a diagrammatic view of a portion of the valve plug operating mechanism shown in Fig. 2, in valve closed, plug seated position.

The arm 61 has a flat surface 64 which is arranged to be substantially parallel with the rods 42 when the lever 40 and the plug 13 are in closed position (see Fig. 9).

The arm 62 has a flat surface 65 which is arranged to be substantially parallel with the rods 42 when the lever 40 and the plug 13 are in open position (see Fig. 15).

On the arm 61 there is an adjustable stop screw 66 adapted to abut a stop 67 when the lever 40 and the plug 13 are in closed position, and on the arm 62 there is an adjustable stop screw 68 adapted to abut a stop 69 when the lever 40 and the plug 13 are in open position.

Since various angular movements are imparted to the valve plug 13 and its operating mechanism during the operation of said mechanism to move the plug from valve closed to open position and vice versa, it is desirable to provide suitable means for indicating the several positions of the plug. Especially is an indicating mechanism for the plug desirable when the valve is buried beneath the surface of the ground in an inaccessible position.

According to the present invention, means are arranged with the valve plug and its mechanism to operate suitable indicating means located preferably at a distance from the main body of the valve.

Figure 3:
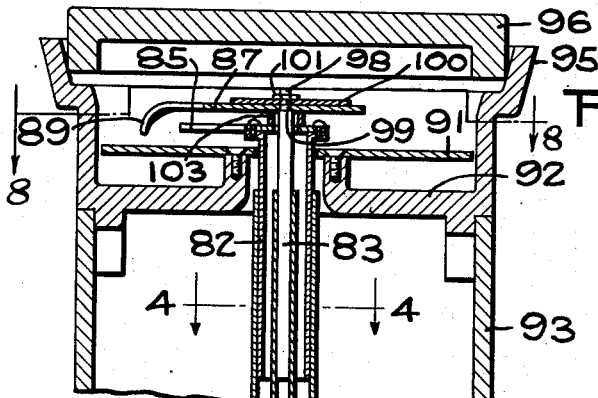
Fig. 3 is a vertical longitudinal section of the valve plug indicating mechanism, the manner in which the section is taken being indicated by the line 3—3 of Fig. 8.

As shown in Fig. 3, the upper end of the plug shaft 23 terminates a slight distance below the cover 30. Secured to the upper end portion of the shaft 23 is a vertically disposed rod 71, the major portion of which is round in cross section and the upper portion of which is made rectangular or square, as indicated at 72, Fig. 3.

As shown in Fig. 7, the lift nut 33 has secured thereto, the lower end of an arm 73. This arm extends from the lift nut upwardly in spaced relation to the upper portion of the shaft 23 and the rotator lever 40, and has an upper horizontal portion 74 which terminates in a vertical tubular member 75 located concentric with the valve shaft 23 and having a vertical bore 76 adapted to receive the rod 71.

The tubular member 75 extends through an opening 77 formed in the cover 30, the joint between said member and said cover being sealed by means of a packing gland 78.

Figure 6:
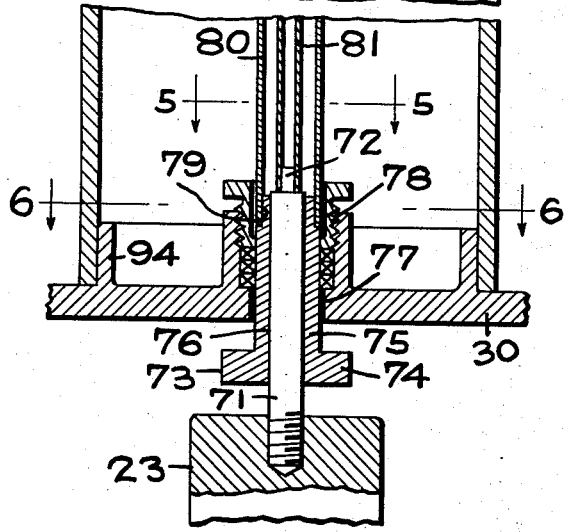
Fig. 6 is a horizontal section taken on the line 6—6 of Fig. 3.

The main body portion of the tubular member 75 is round or circular in cross section. However, at its upper end the exterior of the member 75 is rectangular or square in cross section, as indicated at 79 (Figs. 3 and 6).

Figure 5:
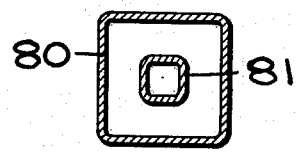
Fig. 5 is a horizontal section taken on the line 5—5 of Fig. 3.

The rectangular or square end portion 79 of the member 75 supports the lower end of a correspondingly shaped tube 80, and the end portion 72 of the rod 71 supports the lower end of a similarly shaped tube 81. The tube 81 is arranged within the tube 80 in spaced relation thereto, as shown in Fig. 5.

Figure 4:
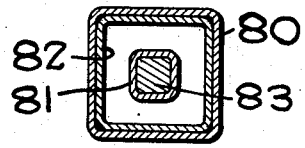
Fig. 4 is a horizontal section taken on the line 4—4 of Fig. 3.

The tubes 80 and 81 may extend upwardly from the valve structure any desired distance, and in order to permit the valve position indicating means to be located at the desired elevation above the valve, the tube 80 has telescopingly mounted therein a similarly formed tube 82, and the tube 81 has telescopingly mounted therein a similarly formed rod 83 (see Figs. 3 and 4).

Fixed to the upper end of the tube 82 is an indicator element in the form of a rectangular plate 85 having impressed on the upper surface thereof an indicating symbol or mark 86. The plate 85 is somewhat elongated in form and one end portion of said plate is secured to the tube 82 as shown best in Fig. 3 (see also Figs. 8, 10, 12 and 14).

Fixed to the upper end of the rod 83 and disposed in spaced relation above the plate 85, is an indicator member or pointer 87.

The indicator member 87 has an opening 88 formed therein of a size to make the indicating mark or symbol 86 visible.

One end of the indicating member 87 is formed with a pointer 89 adapted to cooperate with a valve plug position indicating mark or symbol 90 formed on a plate 91 rigidly supported from the wall 92 of a standard or pipe 93 which encloses the indicating mechanism.

As shown in Fig. 3, the lower end of the standard 93 is fitted to an upstanding flange 94 formed on the cover 30 so that lateral movement of the pipe with respect to the valve structure is prevented.

As shown in Fig. 6 the standard 93 is eccentrically disposed with respect to the center of the valve shaft 23.

The upper portion of the standard 93 is formed with a bell-shaped or flanged member 95 for the reception of a lid or cover 96.

Figure 8:
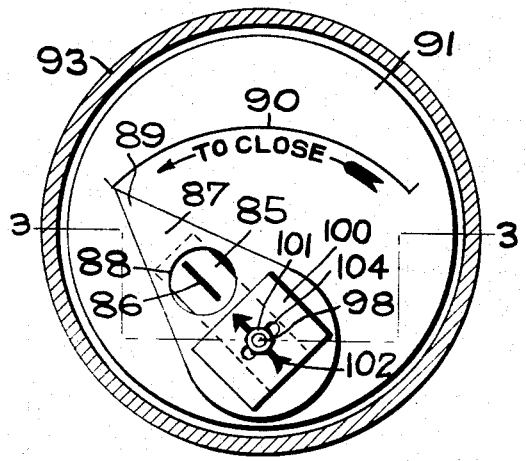
Fig. 8 is a horizontal section taken on the line 8—8 of Fig. 3, showing the indicating mechanism in valve closed, plug seated position.

In order that, when the parts are being assembled, the indicator member 87 can be so positioned as to correctly indicate the position of the valve plug as designated by the symbol or marking 90, since the plate 91 is fixedly mounted, means are provided for shifting the indicator member 87 with respect thereto. As shown in Figs. 3 and 8, the upper end of the rod 83 is formed with a reduced threaded portion 98, so as to provide a shoulder 99. The indicator member 87 is clamped between the shoulder 99 and a plate 100 by means of a nut 101 mounted on the threaded extremity 98 of the rod 83. The plate 100 has an arrow or other suitable indicating symbol 102 on its upper surface. Between the plate 85 and the member 87 there is a loosely mounted sleeve 103. The plate 100 is formed with a slot 104 through which the portion 98 of the rod 83 projects.

The construction of the parts is such that when the valve plug 13 is assembled within the valve casing 11 in closed and seated position, and the valve plug operating mechanism is assembled in valve plug closed and seated position, the indicating means 85, 87 and 100 can be adjusted with respect to the plate 91 so as to properly register with the indicating symbols on the plate 91. With the parts thus correctly positioned when the valve plug 13 is operated by its mechanism towards open position, the indicating means will be actuated in the manner to be hereinafter referred to so as to accurately indicate the position of the valve plug.

In the drawings (Figs. 1 to 9 inclusive), the valve plug 13 and its operating and position indicating mechanism is shown in plug closed position. The cross head 43 is at the extreme end of its travel. By moving the cross head in the direction of the arrow, Fig. 9, the movement being accomplished by the piston rod 51, the roller 45 moves parallel to the surface 64 of the rotator lever arm 61, therefore, the rotator lever 40 is held against rotation and in the position shown in Figs. 2 and 9, because said lever is confined between the roller 45 and the stop 67.

Figure 11:
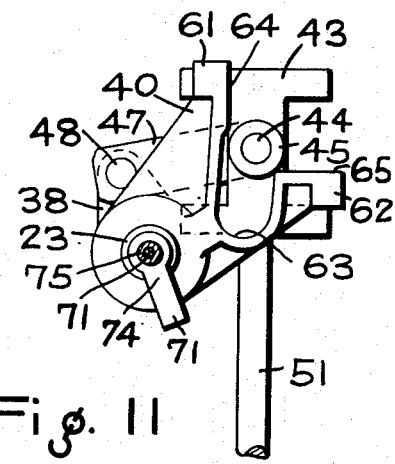
Fig. 11 is a view similar to Fig. 9 showing the position of the operating mechanism when the plug is unseated.

During this movement of the cross head 43, stud 46 through link 47, rotates the lift nut 33 in a counter-clockwise direction, from the position shown in Fig. 9 to the position shown in Fig. 11, and as the valve shaft 23 is held by the rotator lever 40 against rotation, the left nut 33 imparts a vertical axial movement to the valve shaft 23, so that the plug 13 is elevated and thereby unwedged from the wall of the cavity 12.

Figure 10:
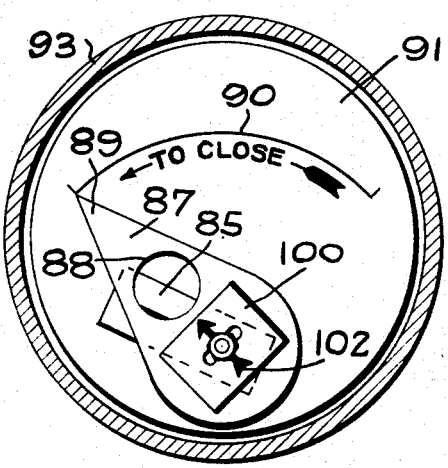
Fig. 10 is a view similar to Fig. 8, showing the indicating mechanism in valve closed, plug unseated position.

Since the plate 85 is operatively connected to the lift nut 33, by means of the tubes 82 and 80, the tubular member 75 and the arm 73, the counter-clockwise movement imparted to the lift nut 33 effects a corresponding counter-clockwise movement to the plate 85, so that the indiacting mark 86 on said plate is moved out of registration with the arrow 102 (se Fig. 10).

The further movement of the cross head 43 towards valve open position now permits the roller 45 to engage the arm 62 of the lever 40 (see Fig. 11), and then by entering the slot 63, the lever 40 is caused to rotate from the position shown in Figs. 9 and 11, to the position shown in Figs. 13 and 15, thereby rotating the valve plug 13.

In the construction shown in the drawings, the movement of the lift nut 33 in a counter-clockwise direction in order to unwedge the valve plug 13 is through an angle of approximately 20°, and the angle of rotation of the rotating lever 40 from valve plug closed to open position is through an angle of approximately 90°.

During the rotation of the lever 40, the lift nut 33 is also rotated and when the lever 40 has been rotated through its angle of 90°, the stop screw 68 abuts the stop 69. It will also be noted that since no relative movement of the lift nut 33 with respect to the rotator lever 40 is effected during the period of operation of the valve mechanism in which the valve plug 13 is turned from closed to open position, the position of the plate 85 with respect to the pointer 87 will remain unchanged (see Figs. 10 and 12), and both of these members will be moved through an angle of 90°.

During the latter part of the rotation of the lever 40 and as the roller 45 emerges from the slot 63 thereof, the link 47 is going through a dead center position so that there is very little rotation of the lift nut 33.

When the roller 45 emerges from the slot 63 it passes along the surface 65 of the arm 62 of the rotator lever 40, and the final movement of the cross head 43 moves the roller 45 along said surface 65, maintaining the rotator lever 40 against rotation as it is locked between the surface 65 and the stop 69.

As the roller 45 moves along the surface 65 from the position shown in Fig. 13 to the position shown in Fig. 15, and as link 47 has gone through its dead center position, this movement of the cross head 43 reverses the rotation of the lift nut 33 to now rotate said lift nut clockwise, and at the same time, the plate 85 is also moved in a clockwise direction back into position beneath the opening 88 in the pointer 87, the movement of the plate 85 being arrested when the mark 86 thereon alines with the arrow 102.

Since the rotator lever 40 is held rigidly with respect to rotation, the final movement of the cross head 43 and clockwise rotation of the lift nut 33 rewedges the plug 13 in the valve cavity 12.

The reverse of all this action takes place with the movement of the cross head in the opposite direction to the direction of the arrow, Fig. 9, or to close the valve.

Reciprocation of the cross head 43 is shown as being accomplished by means of the piston rod 51 but can be accomplished by other means such as a threaded member which would cooperate with threads in the cross head.

The movement of the piston 50 shown in Fig. 2 may be limited by stops 105 and 106, located near each end, respectively, of the hydraulic cylinder 49.

The stop screws 66 and 68 of the rotator lever 40 are adjustable permitting easy alinement of the valve plug 13 in either its open or closed position.

From the foregoing it will be seen that by the present invention means are provided for simultaneously indicating the position of the waterway of the valve plug, as well as the position of the valve plug with respect to its seat in the valve casing, such indicating means being located remotely with respect to the main body of the valve and being operatively connected with the valve operating mechanism so as to be positively actuated thereby.

Having thus described our invention, what we claim is:

1. In a valve, the combination with a plug having an operating shaft and mechanism operatively associated therewith to effect axial movement of said plug and to also turn the plug, of a pointer operatively connected to said plug rotating mechanism and rotatable with the plug, an opening formed in the pointer, a stationary plate underlying the pointer and having indicia thereon cooperating with said pointer for indicating the position of the plug, and an indicating member operatively connected to the axially moving mechanism of said valve plug and located in the space between said pointer and said plate and having a mark thereon visible through the opening in said pointer and cooperating with a mark on said pointer to indicate the axial position of said plug with respect to the rotational position of the plug.

2. In a valve, the combination with a plug having an operating shaft and mechanism operatively associated therewith to effect axial movement of said plug and to also turn the plug, of a pointer operatively connected to said plug rotating mechanism and rotatable with the plug, an opening formed in the pointer, a stationary plate underlying the pointer and having indicia thereon cooperating with said pointer for indicating the position of the plug, and an indicating member operatively connected to the axially moving mechanism of said plug and operable both independently and simultaneously with respect to said pointer, said member being located beneath said pointer and having a mark thereon visible through the opening in said pointer and cooperating with a mark on said pointer to indicate the axial position of said plug.

3. In a valve, the combination with a valve casing having a tapered plug therein and mechanism enclosed by said casing to effect axial movement of said plug and to also rotate the plug, of a tubular standard mounted on said casing substantially in alinement with the axis of said plug, a pointer disposed in the end portion of said standard remote from said plug and operatively connected to said plug rotating mechanism and rotatable with the plug, an opening formed in the pointer, a stationary plate underlying the pointer and having indicia thereon cooperating with said pointer for indicating the position of the plug, and indicating member operatively connected to the axially moving mechanism of said plug and located beneath the pointer, said member having means thereon visible through the opening in the pointer and cooperating with means on said pointer to indicate the axial position of said plug.

4. In a valve, the combination with a tapered plug having an operating shaft and mechanism operatively associated therewith to move the plug axially and to also rotate the plug, of a pointer operatively connected to the plug rotating mechanism and having an opening formed therein, and a member underlying said pointer and operatively connected to the axially moving mechanism of said plug and visible through the opening in the pointer to indicate the axial position of the plug with respect to the rotatable position of the plug.

5. In a valve, the combination with a tapered plug having an operating shaft and mechanism operatively associated therewith to move the plug axially and also to rotate the plug, of means operatively connected to the plug rotating mechanism for indicating the rotatable position of the plug, and means underlying said plug rotatable position indicating means and operatively connected to the axially moving mechanism of the plug for indicating the axial position of the plug with respect to the rotary position of the plug, said plug axial position indicating means being visible through an opening formed in said plug rotary position indicating means.

6. In a valve, the combination with a valve casing having a tapered plug therein and mechanism enclosed by said casing to effect axial movement of said plug and to also rotate the plug, of a tubular standard mounted on said casing, means disposed within the end portion of said standard remote from said plug and operatively connected to said plug rotating mechanism for indicating the angular position of the plug, and separate movable means operatively connected to said axial moving mechanism of the plug and disposed within the tubular standard beneath said plug angular position indicating means and cooperating therewith for indicating the axial movement of the plug with respect to the rotary movement of the plug said plug axial position indicating means being visible through an opening formed in said plug rotary position indicating means.

LAURANCE E. GOIT.
EUGENE C. BRISBANE.